UNITED STATES PATENT OFFICE 1,959,393

1-PHENYL-2-METHYLBENZYLAMINO-PROPANOL-1

Friedrich Stolz and Franz Flaecher, Frankfort-on-the-Main-Hochst, Germany, assignors to Winthrop Chemical Company, Inc., New York, N. Y., a corporation of New York No Drawing. Original application August 22, 1929, Serial No. 387,796. Divided and this application June 23, 1933, Serial No. 677,344. In Germany September 3, 1928

1 Claim. (Cl. 260—128.5)

The present invention relates to 1-phenyl-2-methylbenzylaminopropanol-1.

We have found that 1-phenyl-2-methylbenzylaminopropanol-1 of the following formula:

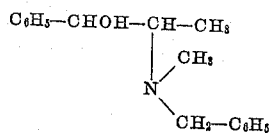

shows valuable therapeutical properties and is especially effective as a spamolitic. This new product can be used in therapy, for instance, for curing asthma.

The new product forms colorless crystals, melting at about 74° C. to about 75° C. It is sparingly soluble in water and readily soluble in most of the organic solvents.

It may, for instance, be prepared from methylbenzylamino-propiophenone by reduction by means of suitable reducing agents such as, for instance, sodium and alcohol or by causing benzyl chloride to react with phenylpropanolmethylamine.

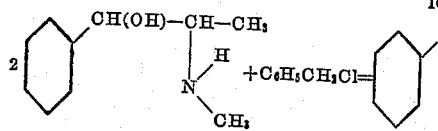

The following examples illustrate the invention:

1. 60 g. of α-methylbenzylaminopropiophenone are dissolved in 600 cc. of absolute alcohol and the boiling solution is gradually mixed with 33 g. of sodium. Then the solution is acidified with dilute hydrochloric acid and the alcohol is distilled off. The distillation residue is dissolved in water and shaken out with ether. The 1-phenyl-2-benzyl-methylaminopropanol (1) base is thereafter separated by means of caustic soda solution and taken up in ether. The base melts at 74° C. to 75° C. and its hydrochloride recrystallized from water or absolute alcohol melts at 169° C. to 170° C. The yield amounts to about 60 per cent of the theoretical.

The reaction takes place according to the following equation:

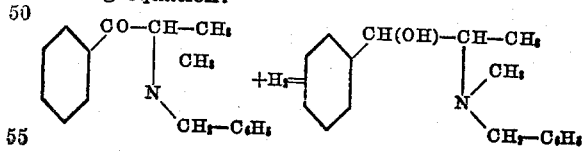

Instead of the α-methylbenzylaminopropiophenone the corresponding hydrochloride can be used with the same good result.

2. 30 g. of α-methylbenzylaminopropiophenone are dissolved in 300 cc. of aqueous ether and the boiling solution is mixed with 16.5 g. of sodium while adding from time to time a small amount of water in the form of drops. The solution is further treated as indicated in Example 1. The yield amounts to about 65 per cent.

3. 230 g. of 1-phenyl-2-methylaminopropanol (1) are dissolved in 250 cc. of benzene and heated for some hours with 127 g. of freshly distilled benzyl chloride to a temperature of 100° C. The whole is then filtered by suction in order to obtain the phenylpropanolmethylamine-hydrochloride which has separated; the latter is washed with benzene. After distillation of the benzene the residue is dissolved in dilute hydrochloric acid and shaken out with ether. The base separated by means of an alkali melts at 74° C. to 75° C. The hydrochloride of the base recrystallized from water or absolute alcohol melts at 169° C. to 170° C. The yield is nearly quantitative.

The reaction takes place according to the following equation:

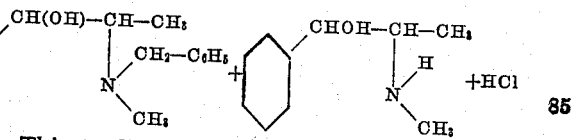

This application is a division of our application Serial No. 387,796, filed August 22, 1929.

We claim:

The 1-phenyl-2-methylbenzylamino-propanol-1 of the following formula:

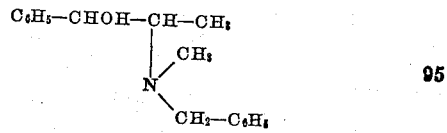

forming colorless crystals, melting at about 74° C. to about 75° C., sparingly soluble in water and readily soluble in most of the organic solvents.

FRIEDRICH STOLZ.
FRANZ FLAECHER.